United States Patent
Crowell et al.

(10) Patent No.: US 9,021,426 B2
(45) Date of Patent: *Apr. 28, 2015

(54) STREAMLINING HARDWARE INITIALIZATION CODE

(71) Applicant: International Business Machines Corporation, Armonk, NY (US)

(72) Inventors: Daniel M. Crowell, Rochester, MN (US); John Farrugia, Austin, TX (US); Michael J. Jones, Cedar Park, TX (US); David Dean Sanner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 162 days.

This patent is subject to a terminal disclaimer.

(21) Appl. No.: 13/693,420

(22) Filed: Dec. 4, 2012

(65) Prior Publication Data

US 2014/0157229 A1  Jun. 5, 2014

(51) Int. Cl.
*G06F 9/44* (2006.01)
*G06F 9/45* (2006.01)

(52) U.S. Cl.
CPC .. *G06F 8/72* (2013.01); *G06F 8/30* (2013.01); *G06F 8/4443* (2013.01)

(58) Field of Classification Search
None
See application file for complete search history.

(56) References Cited

U.S. PATENT DOCUMENTS

| 6,115,544 | A | 9/2000 | Mueller ............... 395/185.1 |
| 6,931,523 | B1* | 8/2005 | Tomoson et al. ......... 713/100 |
| 7,146,544 | B2 | 12/2006 | Hsu et al. ................. 714/57 |
| 7,302,681 | B2* | 11/2007 | Kamalanathan .......... 717/173 |
| 7,409,685 | B2* | 8/2008 | Chen et al. ............... 717/170 |
| 7,624,318 | B2* | 11/2009 | Bieswanger et al. ...... 714/723 |
| 7,913,304 | B2 | 3/2011 | Cao et al. .................. 726/23 |
| 8,095,831 | B2 | 1/2012 | Moyer et al. .............. 714/57 |
| 8,799,879 | B2* | 8/2014 | Wright et al. ............ 717/148 |
| 2007/0294663 | A1* | 12/2007 | McGuire et al. .......... 717/108 |
| 2007/0294665 | A1* | 12/2007 | Papakipos et al. ........ 717/119 |
| 2007/0294682 | A1* | 12/2007 | Demetriou et al. ....... 717/153 |
| 2008/0098207 | A1* | 4/2008 | Reid et al. ................ 712/227 |
| 2008/0098208 | A1* | 4/2008 | Reid et al. ................ 712/234 |
| 2008/0114937 | A1* | 5/2008 | Reid et al. ................ 711/117 |
| 2009/0006835 | A1* | 1/2009 | Kim ........................ 713/2 |
| 2012/0180030 | A1* | 7/2012 | Crutchfield et al. ...... 717/149 |
| 2013/0275691 | A1* | 10/2013 | Chew ..................... 711/154 |

\* cited by examiner

*Primary Examiner* — Don Wong
*Assistant Examiner* — Roberto E Luna
(74) *Attorney, Agent, or Firm* — VanLeeuwen & VanLeeuwen; Parashos T. Kalaitzis

(57) ABSTRACT

According to one embodiment of the present disclosure, hardware initialization code and error action information are retrieved from separate storage areas. The hardware initialization code includes code that initializes a device, and also includes placeholders corresponding to actions that are performed when the device fails initialization. Likewise, the error action information describes the actions that are performed when the device fails initialization. The error action information is converted into macros that include lines of code. As such, the error action placeholders are matched to the macros and, in turn, each of the error action placeholders is replaced with the lines of code corresponding to the matched macros.

12 Claims, 7 Drawing Sheets

STREAMLINING HARDWARE INITIALIZATION CODE

BACKGROUND

The present disclosure relates to streamlining hardware initialization code. More particularly, the present disclosure relates to converting separated error action information into lines of code, and including the lines of code into the hardware initialization code prior to code compilation.

Hardware initialization code initializes devices that are included in a computer system, such as processors, memory controllers, and etcetera. At times, a device may not initialize properly and, as a result, the hardware initialization code generates and error and performs actions based upon the type of error. Actions may include collecting local debug data, identifying/deconfiguring failing devices, and/or creating a persistent de-configuration record for failing hardware. Typically, information that describes the actions (e.g., error action information) is embedded in the hardware initialization source code. As a result, the hardware initialization source code and/or the error action information is difficult to analyze and de-bug.

BRIEF SUMMARY

According to one embodiment of the present disclosure, hardware initialization code and error action information are retrieved from separate storage areas. The hardware initialization code includes code that initializes a device, and also includes placeholders corresponding to actions that are performed when the device fails initialization. Likewise, the error action information describes the actions that are performed when the device fails initialization. The error action information is converted into macros that include lines of code. As such, the error action placeholders are matched to the macros and, in turn, each of the error action placeholders is replaced with the lines of code corresponding to the matched macros.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
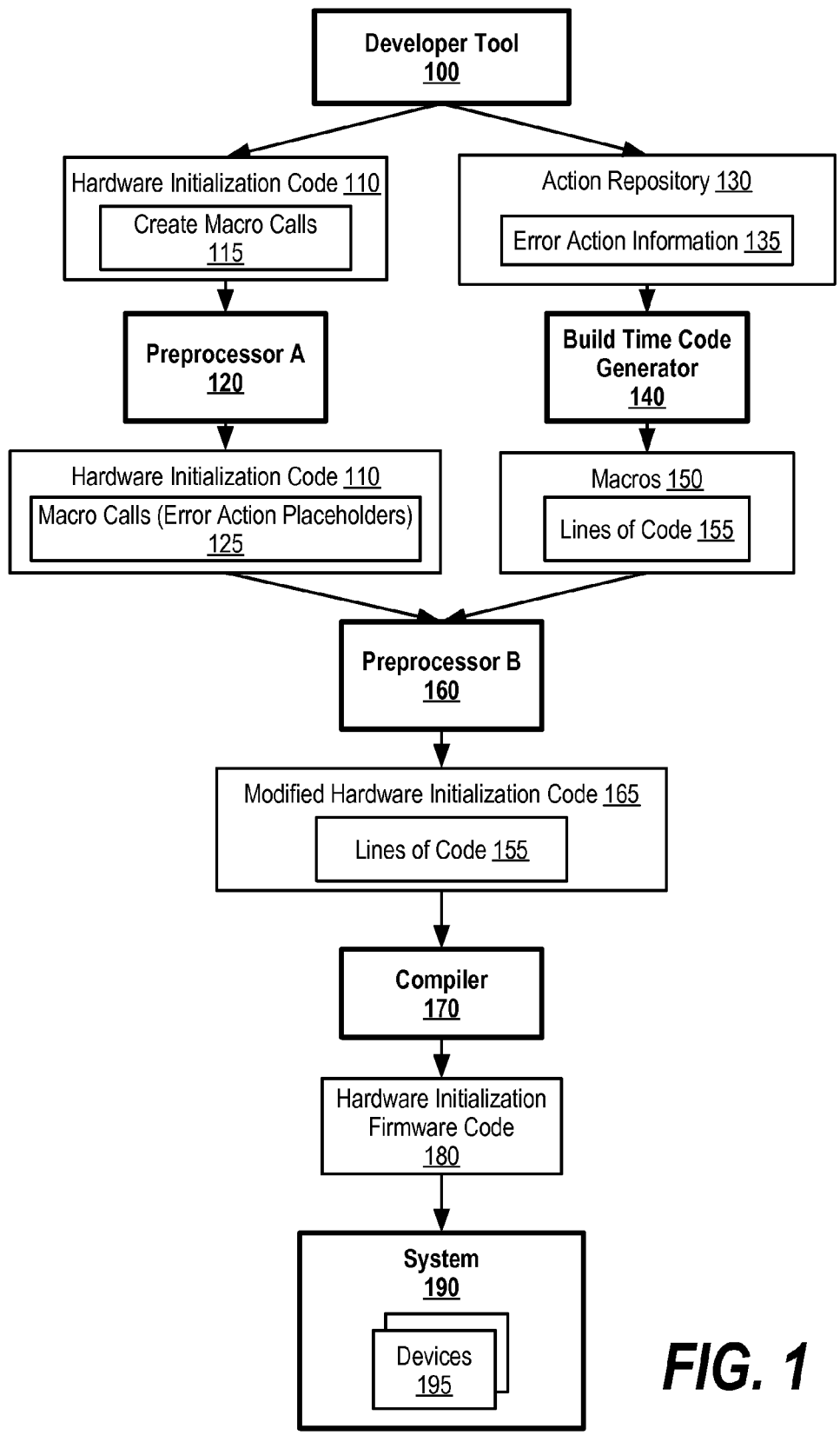
FIG. 1 depicts lines of code generated from error action information stored in an action repository, and the lines of code combined with hardware initialization code prior to code compilation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 depicts lines of code generated from error action information, and the lines of code subsequently combined with hardware initialization code prior to code compilation. Developer tool 100 generates hardware initialization code 110 and error action information 130. Hardware initialization code 110, in one embodiment, is source code written in a format such as C++. Create macro calls 115 (create macro call functions) are inserted into hardware initialization code 110 at particular "device initialization" locations. Prior to this disclosure, these device initialization locations included several lines of source code that performed actions when a device fails initialization. By eliminating these lines of code from hardware initialization code 110, hardware initialization code 110's business logic is streamlined (discussed below).

Preprocessor A 120 generates macro calls 125 (macro call functions) for each of create macro calls 115. For example, a create macro call may state "create_err(error_X)" and, in this example, preprocessor A 120 generates three macro calls "error_X_deconfig" "error_X_localdata," and "error_X_call_func" (see FIGS. 3, 4, and corresponding text for further details). In one embodiment, preprocessor A 120 creates similar macro calls for each of create macro calls (e.g., a "deconfig" macro call, a "localdata" macro call, and a "call_func" macro call). Macro calls 125 are also referred to herein as "error action placeholders" because they are replaced with lines of code 155 by preprocessor B 160 (discussed below).

Error action information 135 includes descriptions of the actions to perform when a device fails initialization. For example, error action information 135 may include "deconfigure master chip" when "error X" occurs (see FIG. 4 and corresponding text for further details). In one embodiment, action repository 130 is a human-readable data repository (e.g., XML data file) and error action information 135 is written in a human-recognizable format. In this embodiment, the human-recognizable format is oriented towards human recognition (formatted text) as opposed to a machine-recognizable format that is recognized by a machine (e.g., source code, compiled code, etc.).

Build time code generator 140 creates macros 150 from error action information 135 (e.g., using a PERL script). Each of macros 150 includes lines of code 155 (source code), which may be different for each of macros 150. For example, a macro "ERROR_X_DECONFIG" may include a line of code such as "deconfigureFunction(MASTER_CHIP)," whereas a macro "ERROR_X_LocalData" may include several lines of code such as "saveLocalData(DATA_X)" and "saveLocalData(DATA_Y)" (see FIG. 4 and corresponding text for further details).

Preprocessor B 160 matches each of macro calls 125 with one of macros 150 and, in turn, replaces each of macro calls 125 with the corresponding matched macro's lines of code 155 to generate modified hardware initialization code 165. In one embodiment, a matching macro 150 may not include a line of code, such as when local data should not be saved for a particular error. In this embodiment, processor B 160 may remove the unmatched macro call from hardware initialization code 110 and not insert a line of code.

Compiler 170 compiles modified hardware initialization code 165 to generate hardware initialization firmware code 180, which is loaded onto system 190. System 190 executes hardware initialization firmware code 180 to initialize devices 195 (e.g., processors, memory, etc.). In turn, when one of devices 195 fails to initialize properly, system 190 performs the appropriate actions described in error action information 135. For example, system 190 may initialize a processor and determine that the processor did not initialize properly. In this example, system 190 may deconfigure the processor or place the processor in a limited function state (see FIG. 2 and corresponding text for further details).

Figure 2:
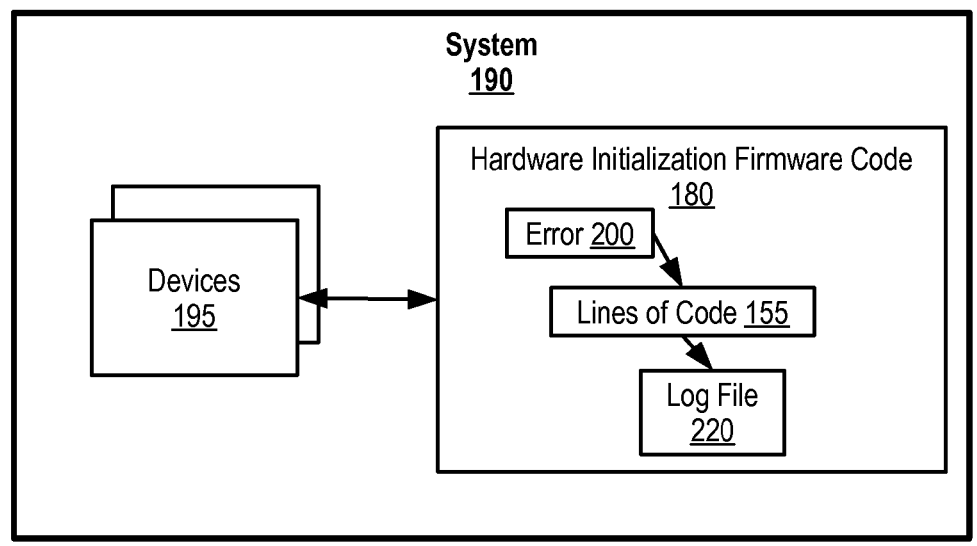
FIG. 2 is a diagram showing a system executing hardware initialization firmware code and taking actions due to a device initialization failure.

FIG. 2 is a diagram showing a system executing hardware initialization firmware code and taking actions due to a device initialization failure. When system 190 executes hardware initialization firmware code 180 and detects that one of devices 195 does not initialize properly, hardware initialization firmware code 180 generates error 200. In turn, hardware initialization firmware code 180 executes lines of code 155 that correspond to error 200, such as deconfiguring the failing device. In one embodiment, lines of code 155 logs error data in a log file (log file 220) that captures information, such as the state of system 190 during the failed device initialization.

In another embodiment, system 190 provides information pertaining to the device's failed initialization (e.g., from log file 220) to developer tool 100. In this embodiment, referring to FIG. 1, developer tool 100 may be utilized to debug hardware initialization code 110, error action information 135, and/or system 190 (e.g., hardware issues). Due to the fact that the error action information is separate from hardware initialization code 110's business logic, the debugging process of hardware initialization code and error action information 135 is simplified.

Figure 3:
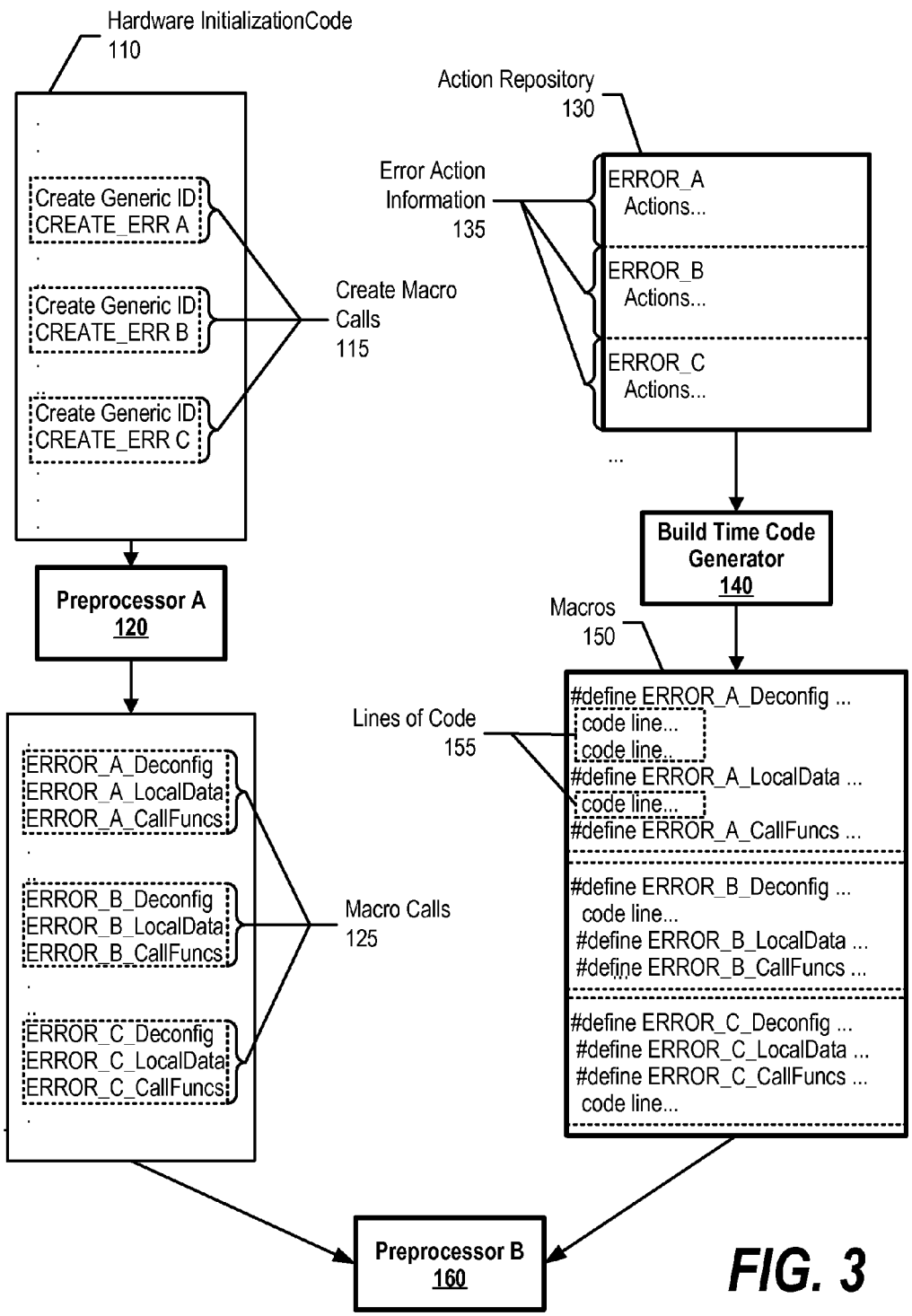
FIG. 3 is a diagram showing multiple macro calls (error action placeholders) generated from create macro call functions, and error action information converted to lines of code.

FIG. 3 is a diagram showing multiple macro calls (error action placeholders) generated from create macro call functions, and error action information converted to lines of code. Preprocessor A 120 expands each of error create macro call 115's to macro calls 125. The example in FIG. 3 shows that preprocessor A 120 expands each create macro call to three different macro calls to support three different action options (e.g., deconfigure hardware, store local data, call functions). In one embodiment, developer tool 100 also creates generic IDs in hardware initialization code 110 required by local macros.

Build time code generator 140 generates macros 150 for error action information 135. The example shown in FIG. 3 shows that action repository 130 includes information that describes actions to take for three different errors (ERROR_A, ERROR_B, and ERROR_C). As such, build time code generator 140 generates lines of code 155, broken out by error, based upon error action information 135. For example, when "ERROR_B" occurs, a developer may not wish to store local data. In this example, error action information 135 does not include an action description in ERROR_B to store local data and, in turn, build time code generator 140 does not insert a line of code in ERROR_B's macro 150 to collect local data.

Figure 4:
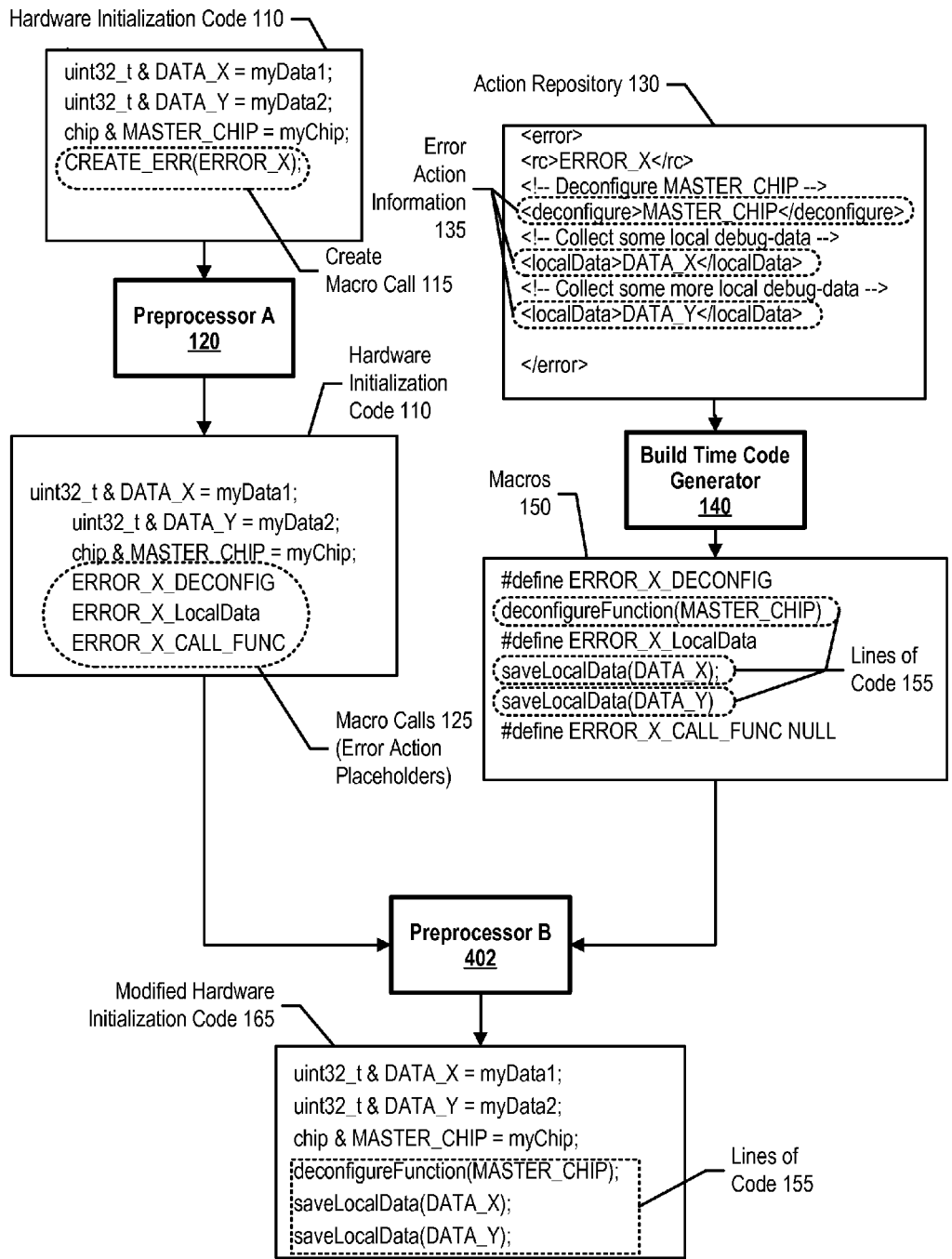
FIG. 4 is a diagram showing hardware initialization code being modified by replacing error action placeholders with lines of code that perform actions when a device fails initialization.

Preprocessor B 160 replaces each of macro calls 125 with their matching macros 150's lines of code 155 to generate modified hardware initialization code 165 (see FIG. 4 and corresponding text for further details).

FIG. 4 is a diagram showing hardware initialization code being modified by replacing error action placeholders with lines of code that perform actions when a device fails initialization. Hardware initialization code 110 includes create macro call 115, which corresponds to "ERROR X" being generated in response to a device initialization failure. Preprocessor A 120 expands error create macro call 115 into three macro calls 125, which call macros "DECONFIG," "LocalData," and "CALL_FUNC." These macro calls may be referred to as error action placeholders because they are replaced by lines of code that perform actions in response to an error generated from a device failing initialization (discussed below).

Action repository 130 includes error action information 135 for "ERROR X," which includes deconfiguring a master chip and collecting local debug data. Build time code generator 140 converts error action information 135 into a macro 150 for ERROR X that includes lines of code 155. In turn, preprocessor B 160 replaces macro calls 125 with lines of code 155 to generate modified hardware initialization code 165. As can be seen, modified hardware initialization code 165 includes lines of code 155 in place of macro calls 125.

Figure 5:
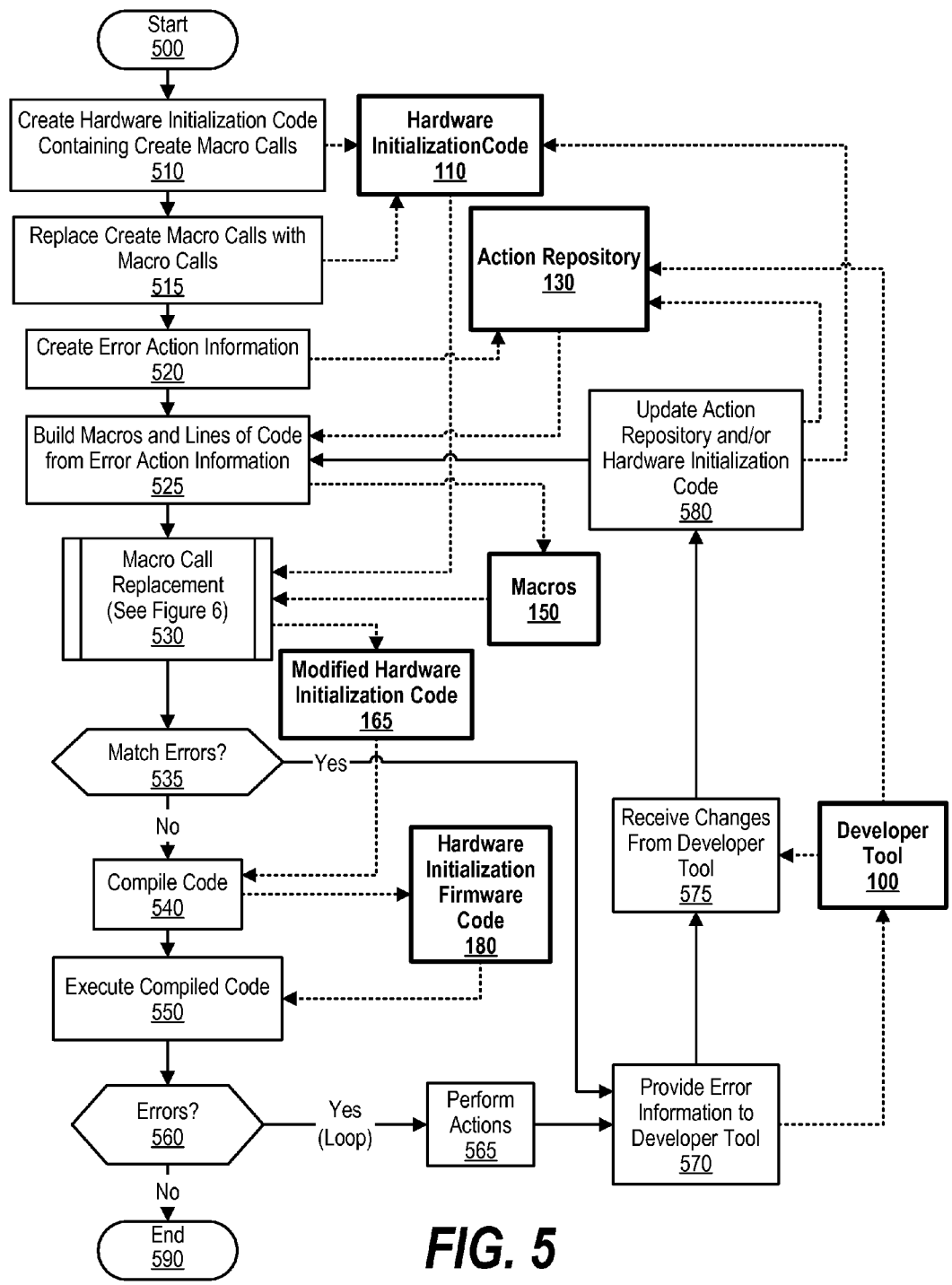
FIG. 5 is a flowchart showing steps taken in modifying hardware initialization code with lines of code generated from error action information stored in a separate repository.

FIG. 5 is a flowchart showing steps taken in modifying hardware initialization code with lines of code generated from error action information stored in a separate repository. Processing commences at 500, whereupon processing creates hardware initialization code 110 (e.g., source code) from instructions received from developer tool 100 (step 510). Hardware initialization code 110 includes "create macro calls" that, in one embodiment, may include generic ID lines to capture local variables and store them in a global storage area for use by corresponding macro calls (see FIG. 3 and corresponding text for further details).

At step 515, processing (preprocessor A 120) replaces the create macro calls with macro calls. In one embodiment, the replacement process is predefined such that processing replaces each create macro call with a set of macro calls (see FIG. 3 and corresponding text for further details). Next, processing adds error action information received from developer tool 100 into action repository 130 (step 520). The error action information describes actions to take when a particular error occurs in hardware initialization code 110, such as deconfiguring hardware. Processing, at step 525, builds macros 150 from the error action information included in action repository 130. As those skilled in the art can appreciate, steps 510-525 may be performed in an order different than what is shown in FIG. 5, such as concurrently generating hardware initialization code and error action information.

Figure 6:
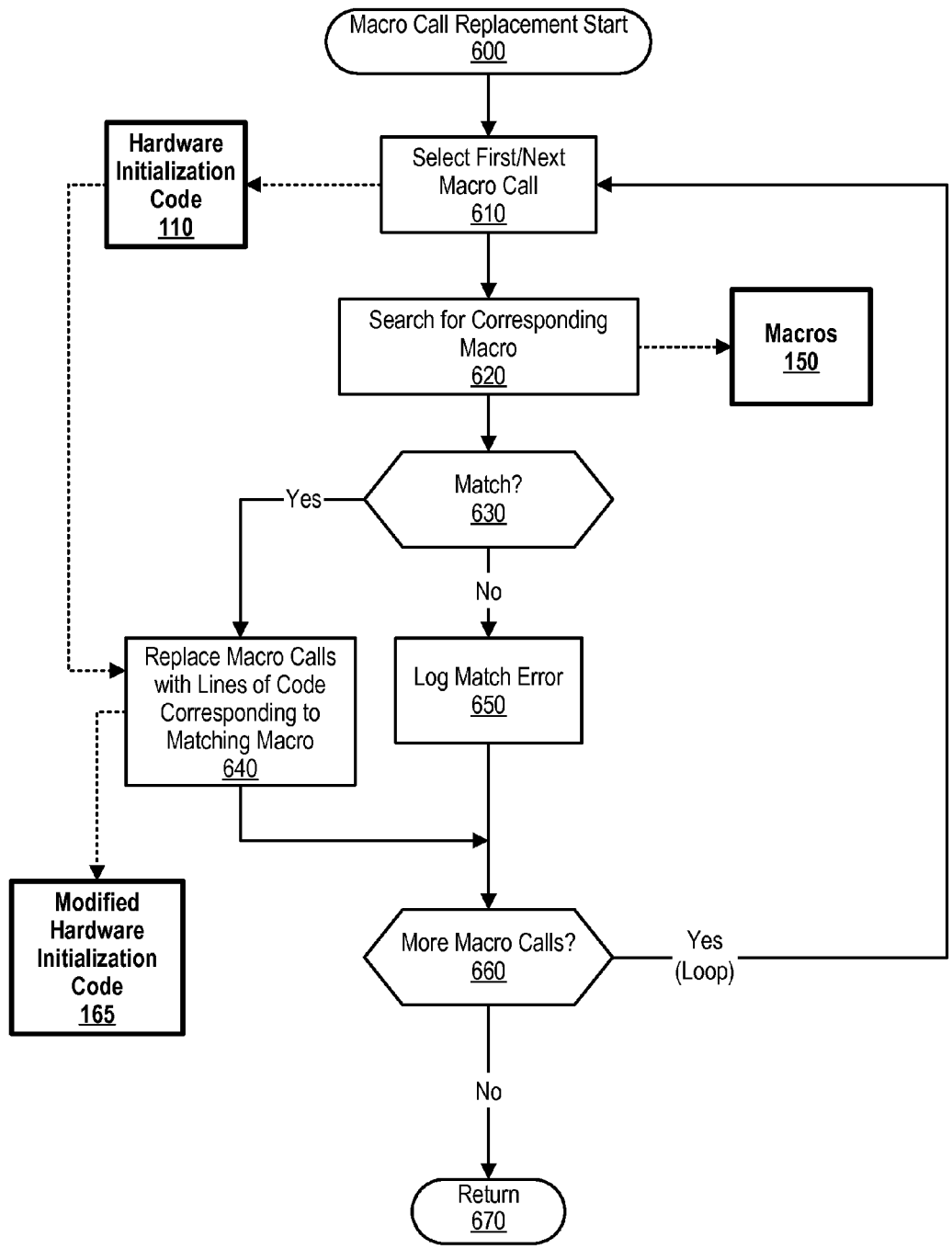
FIG. 6 is a flowchart showing steps taken in replacing macro calls included in hardware initialization code with lines of code that perform device initialization failure actions.

In turn, processing (preprocessor B 160) modifies hardware initialization code 110 by replacing the macro calls included in hardware initialization code 110 with the lines of code corresponding to macros 150 that match the macro calls (pre-defined process block 530, see FIG. 6 and corresponding text for further details). A determination is made as to whether there were any problems with matching the macro calls with the macros (decision 535). If there were problems, decision 535 branches to the "Yes" branch, whereupon processing provides the matching error information to developer tool 100 at step 570. In turn, developer tool 100 provides changes to hardware initialization code 100 and/or the error action information (step 575), which processing updates accordingly at step 580.

On the other hand, if no match errors occurred, decision 535 branches to the "No" branch, whereupon processing compiles the updated hardware initialization code at step 540 to create hardware initialization firmware code 180. At step 550, system 190 executes hardware initialization firmware code 180, and a determination is made as to whether an error was generated in response to detecting a device initialization failure (decision 560). If errors were generated, decision 560 branches to the "Yes" branch, whereupon system 190 performs the actions corresponding to the error at step 565 (e.g., de-configure hardware), and provides information pertaining to the error (e.g., error ID, log information, etc.) to developer tool 100 at step 570 (e.g., if instructed by the lines of code).

At step 575, processing receives changes from developer tool 100, which may be changes to hardware initialization code 110 and/or changes to the error action information included in action repository 130. Processing updates hardware initialization code 110 and/or action repository 130 accordingly at step 580, and proceeds to re-generate macros 150 and modified hardware initialization code 165. In one embodiment, developer tool 100 may be utilized to debug hardware (system 190) in response to analyzing the error information.

On the other hand, if no errors occurred from executing hardware initialization firmware code 180, decision 560 branches to the "No" branch, whereupon processing ends at 590.

FIG. 6 is a flowchart showing steps taken in replacing macro calls (error action placeholders) included in hardware initialization code with lines of code that perform device initialization failure actions. Processing commences at 600, whereupon processing selects a first macro call in hardware initialization code 110 at step 610. Processing, at step 620, searches macros 150 for a macro that matches the selected macro call.

A determination is made as to whether a corresponding macro was matched with the macro call (decision 630). If a macro was matched, decision 630 branches to the "Yes" branch, whereupon processing replaces the macro call in hardware initialization code 110 with lines of code corresponding to the matched macro at step 640 to create modified hardware initialization code 165. Modified hardware initialization code 165 includes the business logic code included in hardware initialization code 110 along with lines of code that perform actions in response to a device initialization failure (see FIG. 4 and corresponding text for further details). On the other hand, if processing did not identify a macro that matched the selected macro call, decision 630 branches to the "No" branch, whereupon processing logs a "match" error at step 650.

A determination is made as to whether there are more macro calls to evaluate in hardware initialization code 110 (decision 660). If there are more macro calls to evaluate, decision 660 branches to the "Yes" branch, which loops back to select and evaluate the next macro call in hardware initialization code 110. This looping continues until there are no more macro calls to evaluate, at which point decision 660 branches to the "No" branch, whereupon processing returns at 670.

Figure 7:
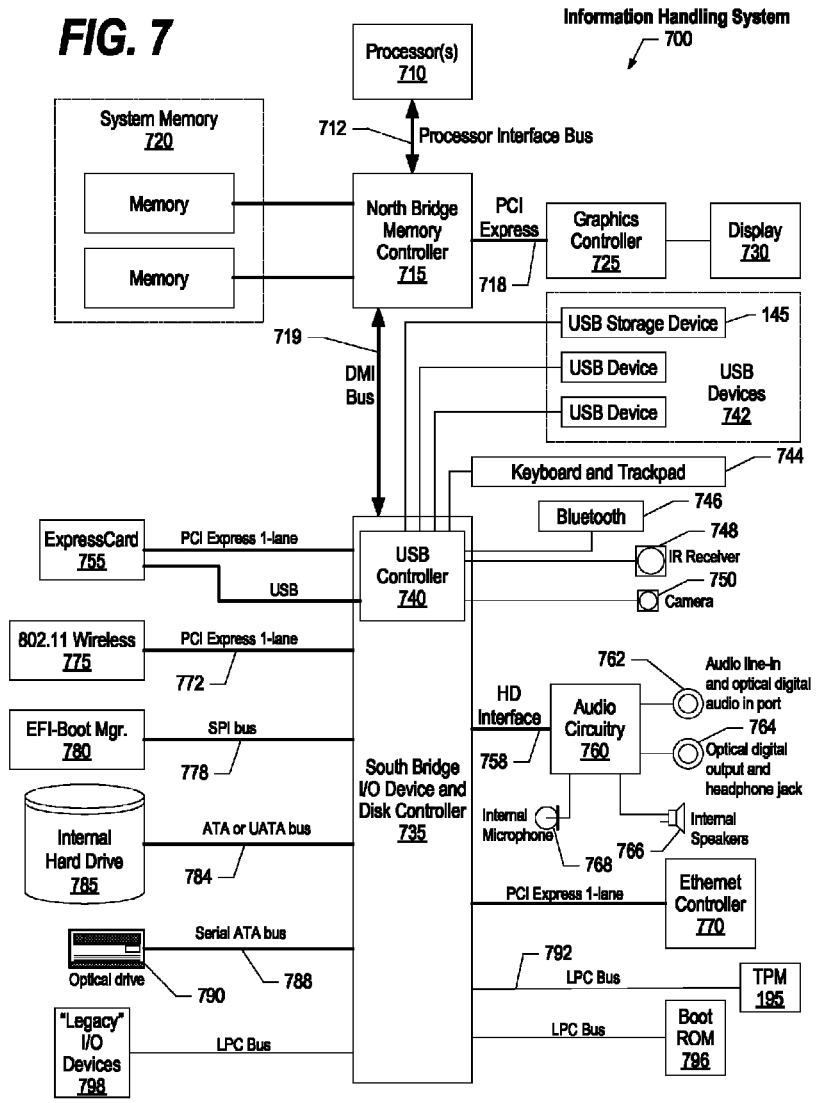
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   one or more storage areas coupled to at least one of the processors;
   a set of computer program instructions stored in the memory and executed by at least one of the processors in order to perform actions of:
   retrieving, from a first one of the storage areas, hardware initialization code that is adapted to initialize a device, wherein the hardware initialization code also includes an error action placeholder, corresponding to one or more actions that are performed in response to detecting a failure during the initialization of the device;
   retrieving error action information from a second one of the storage areas, wherein the error action information describes at least one of the one or more actions;
   converting the error action information to one or more macros, wherein each of the one or more macros includes one or more lines of code;
   matching the error action placeholder to one of the one or more macros;
   replacing, the error action placeholder in the hardware initialization code with the lines of code corresponding to the matched macro, resulting in modified hardware initialization code;
   compiling the modified hardware initialization code, resulting in hardware initialization firmware code; and
   executing the hardware initialization firmware code wherein, during the execution, the hardware initialization firmware code executes one or more of the actions in response to the device failing the initialization.

2. The information handling system of claim 1 wherein:
   the error action information is generated in human-recognizable format; and
   the hardware initialization code includes a plurality of error action placeholders that are macro call functions, wherein the error action placeholder is included in the plurality of error action placeholders and is one of the macro call functions.

3. The information handling system of claim 2 wherein one or more of the processors perform additional actions comprising:
   converting one more create macro calls included in the hardware initialization code to the macro call functions.

4. The information handling system of claim 1 wherein one of the actions de-configures the device in response to the device failing initialization.

5. The information handling system of claim 1 wherein one of the actions logs error data in response to the device failing initialization, and wherein one or more of the processors perform additional actions comprising:
   providing the logged error data to a developer tool;
   receiving, from the developer tool, one or more software changes;
   in response to the one or more software changes corresponding to one or more of the actions:
   updating the error action information in the second storage area;
   converting the updated error action information to one or more updated lines of code; and
   modifying the hardware initialization code by replacing the error action placeholder with the one or more updated lines of code.

6. The information handling system of 5 wherein, in response to the one or more software changes corresponding to the hardware initialization code, and wherein one or more of the processors perform additional actions comprising:
   updating the hardware initialization code based upon the one or more software changes; and
   modifying the updated hardware initialization code by replacing the error action placeholder with the lines of code corresponding to the macro that matched the error action placeholder.

7. A computer program product stored in a non-transitory computer readable storage medium, comprising computer program code that, when executed by an information handling system, causes the information handling system to perform actions comprising:
   retrieving, from a first storage area, hardware initialization code that is adapted to initialize a device, wherein the hardware initialization code also includes an error action placeholder, corresponding to one or more actions that are performed in response to detecting a failure during the initialization of the device;

retrieving error action information from a second storage area, wherein the error action information describes at least one of the one or more actions
converting the error action information to one or more macros, wherein each of the one or more macros includes one or more lines of code;
matching the error action placeholder to one of the one or more macros;
replacing, the error action placeholder in the hardware initialization code with the lines of code corresponding to the matched macro, resulting in modified hardware initialization code;
compiling the modified hardware initialization code, resulting in hardware initialization firmware code; and
executing the hardware initialization firmware code wherein, during the execution, the hardware initialization firmware code executes one or more of the actions in response to the device failing the initialization.

8. The computer program product of claim 7 wherein the error action information is generated in human-recognizable format; and
the hardware initialization code includes a plurality of error action placeholders that are macro call functions, wherein the error action placeholder is included in the plurality of error action placeholders and is one of the macro call functions.

9. The computer program product of claim 8 wherein the information handling system performs additional actions comprising:
converting one more create macro calls included in the hardware initialization code to the macro call functions.

10. The computer program product of claim 7 wherein one of the actions de-configures the device in response to the device failing initialization.

11. The computer program product of claim 7 wherein one of the actions logs error data in response to the device failing initialization, and wherein the information handling system performs additional actions comprising:
providing the logged error data to a developer tool;
receiving, from the developer tool, one or more software changes;
in response to the one or more software changes corresponding to one or more of the actions:
updating the error action information in the second storage area;
converting the updated error action information to one or more updated lines of code; and
modifying the hardware initialization code by replacing the error action placeholder with the one or more updated lines of code.

12. The computer program product of 11 wherein, in response to the one or more software changes corresponding to the hardware initialization code, and wherein the information handling system performs additional actions comprising:
updating the hardware initialization code based upon the one or more software changes; and
modifying the updated hardware initialization code by replacing the error action placeholder with the lines of code corresponding to the macro that matched the error action placeholder.

* * * * *